G. A. THODE.
TRACTION ENGINE.
APPLICATION FILED NOV. 30, 1914.
1,161,424. Patented Nov. 23, 1915.
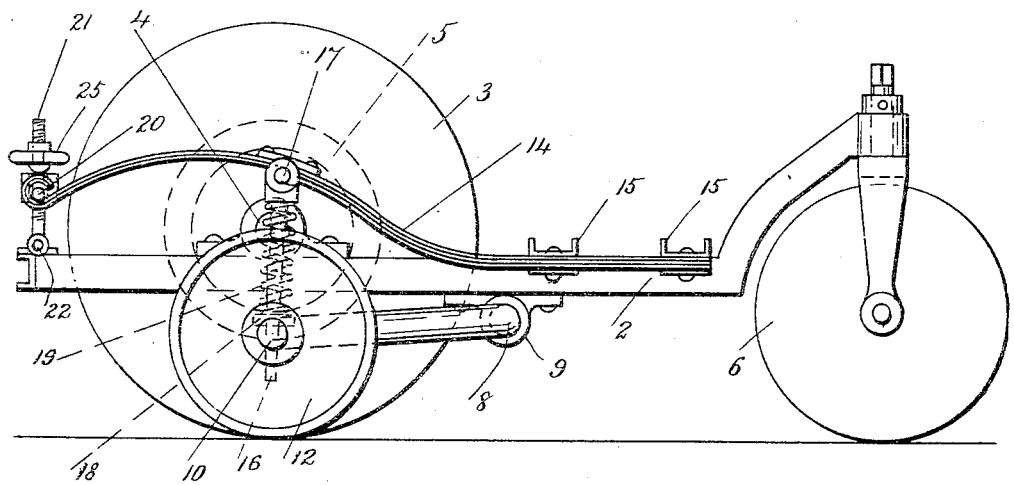
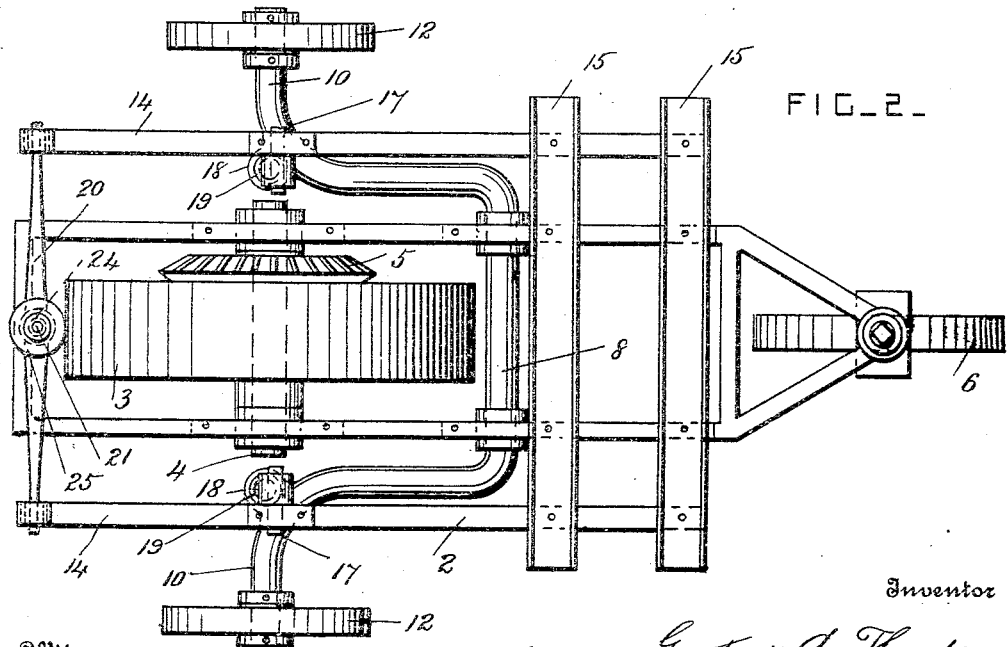

UNITED STATES PATENT OFFICE.

GUSTAV A. THODE, OF PINE BLUFF, WYOMING.

TRACTION-ENGINE.

1,161,424.  Specification of Letters Patent.  Patented Nov. 23, 1915.

Application filed November 30, 1914. Serial No. 874,741.

*To all whom it may concern:*

Be it known that I, GUSTAV A. THODE, a citizen of the United States, residing at Pine Bluff, in the county of Laramie and State of Wyoming, have invented certain new and useful Improvements in Traction-Engines; and I do hereby declare the following to be a full, clear, and exact description of the invention, such as will enable others skilled in the art to which it appertains to make and use the same.

This invention relates to traction engines provided with a centrally arranged drive wheel or earth creeper which comes in contact with the ground and by means of which the propulsion of the load is effected; and it consists in the novel construction and combination of the parts hereinafter fully described and claimed by which the stabilization of the traction engine is effected.

In the drawings. Figure 1 is a side view of portions of a traction engine constructed according to this invention. Fig. 2 is a plan view of the same.

The traction engine is provided with a main frame 2, and 3 is a traction wheel or similar traction device mounted on an axle 4 and journaled centrally in the frame. The traction wheel is of any approved construction, and an earth creeper of approved construction may be used in place of it, or a plurality of traction wheels may be used if arranged at the center part of the frame.

A toothed wheel 5 is shown as a means for driving the traction device or wheel, but the traction device may be operated by any approved means carried by the frame and actuated by any suitable motor. A pivoted steering wheel 6 is provided at the other end portion of the frame 2 from the traction wheel 3. The steering devices may be of any approved kind, and a pair of steering wheels may be used, if desired.

In order to stabilize the traction engine and prevent it from falling over, and to permit it to work on rough ground, a crankshaft 8 is journaled in bearings 9 at the middle part of the frame between the traction wheel and the steering wheel or mechanism. This crankshaft has cranks 10 on its ends, and 12 are ground wheels journaled on the cranks 10, and arranged one on each side of the traction wheel at a suitable distance from the frame. These ground wheels are pressed against the ground by springs, and the spring pressure is adjusted so that the weight of the traction engine is chiefly on the traction wheel, and so that the downward pressure of the ground wheels is only sufficient to prevent the tractor from tipping over.

Leaf springs 14 are secured at one end to crossbars 15 which are secured to the frame between the traction wheel and the steering wheel. These leaf springs 14 are curved upwardly, and they project rearwardly over the cranks 10. Bars 16 are pivoted by pins 17 to the middle parts of the springs 14, and the lower end portions of the bars 16 are slidable in holes in lugs 18 on the cranks 10. Helical springs 19 are arranged around the bars 16 between the lugs 18 and the springs 10.

A crossbar 20 is arranged between the free end portions of the springs 10, and a screw 21 is pivoted by a pin 22 to the middle part of the frame, and is slidable loosely in a hole 24 in the middle part of the crossbar 20. A handwheel 25 for regulating the pressure is mounted in engagement with the screw and bears downwardly on the crossbar 20.

The arrangement of springs may be variously modified in carrying out this invention, but the arrangement hereinbefore described is preferred as it enables the pressure on both ground wheels to be adjusted simultaneously.

The crossbar 20 is free to move pivotally on the adjusting screw so that the ground wheels can rise and descend independently of each other in passing over rough ground, for which a traction engine with a central traction device is specially adapted.

What I claim is:

1. In a traction engine, the combination, with a frame, a traction device mounted centrally in the frame, and steering mechanism arranged at one end portion of the frame; of a crankshaft journaled in the middle portion of the frame and provided with cranks at its ends which project laterally one on each side of the traction device, ground wheels mounted on the said cranks, leaf springs secured at one end to the frame and projecting rearwardly over the said cranks, rods pivoted to the leaf springs, and helical springs encircling the said rods and arranged between the leaf springs and the cranks.

2. In a traction engine, the combination, with a frame, a traction device mounted centrally in the frame, and steering mechanism arranged at one end portion of the frame; of a crankshaft journaled in the middle part of the frame and provided with cranks at its ends which project laterally one on each side of the traction device, ground wheels mounted on the said cranks, leaf springs secured at one end to the frame and projecting rearwardly over the said cranks, a crossbar between the free ends of the leaf springs, an adjusting screw arranged pivotally between the middle part of the frame and the middle part of the crossbar and provided with means for adjusting the spring pressure, rods pivoted to the middle parts of the leaf springs, and helical springs encircling the said rods and arranged between the leaf springs and the cranks.

In testimony whereof I have affixed my signature in the presence of two witnesses.

GUSTAV A. THODE.

Witnesses:
FRANK BLOOM,
H. H. WHALEY.